United States Patent [19]

Liang

[11] Patent Number: 5,319,644
[45] Date of Patent: Jun. 7, 1994

[54] METHOD AND APPARATUS FOR IDENTIFYING PORT/STATION RELATIONSHIPS IN A NETWORK

[75] Inventor: Chao-Yu Liang, San Jose, Calif.

[73] Assignee: Synoptics Communications, Inc., Santa Clara, Calif.

[21] Appl. No.: 933,394

[22] Filed: Aug. 21, 1992

[51] Int. Cl.$^5$ ................... H04L 12/42; H04L 12/46
[52] U.S. Cl. ........................ 370/85.5; 370/85.14; 370/85.15; 370/92; 340/825.07; 340/825.05
[58] Field of Search ............. 370/85.1, 85.4, 85.5, 370/85.15, 13, 14, 17, 92, 85.8, 95.2, 85.12, 56; 340/825.05, 825.06, 825.07, 825.52, 825.53, 825.08

[56] References Cited

U.S. PATENT DOCUMENTS

| | | | |
|---|---|---|---|
| 4,546,467 | 10/1985 | Yamamoto | 370/13 |
| 4,881,074 | 11/1989 | Reichbauer | 370/85.15 |
| 4,916,444 | 4/1990 | King | 370/85.12 |
| 5,132,962 | 7/1992 | Hobgood et al. | 370/16.1 |
| 5,179,554 | 1/1993 | Lomicka et al. | 370/92 |

Primary Examiner—Benedict V. Safourek
Assistant Examiner—Hassan Kizou
Attorney, Agent, or Firm—Blakely, Sokoloff, Taylor & Zafman

[57] ABSTRACT

A method and apparatus for associating stations to a port on a network concentrator. The network concentrator implements a network having a Ring based topology. Associating stations to ports provides for the coupling of multiple stations to a single port. Three maps are created which describe the network, a port map, a station map and an exit station map. The port map identifies the ports having one or more stations coupled to it. The station map identifies each station in the network. The exit station map identifies for each port with a station coupled to it, the station which transmits data into the port. By identifying the stations between two exit stations on adjacent ports in the network concentrator, the stations coupled to a port are determined. The identification of exit stations is facilitated by the use of an exit station detection circuit located at the port.

13 Claims, 15 Drawing Sheets

PRIOR ART

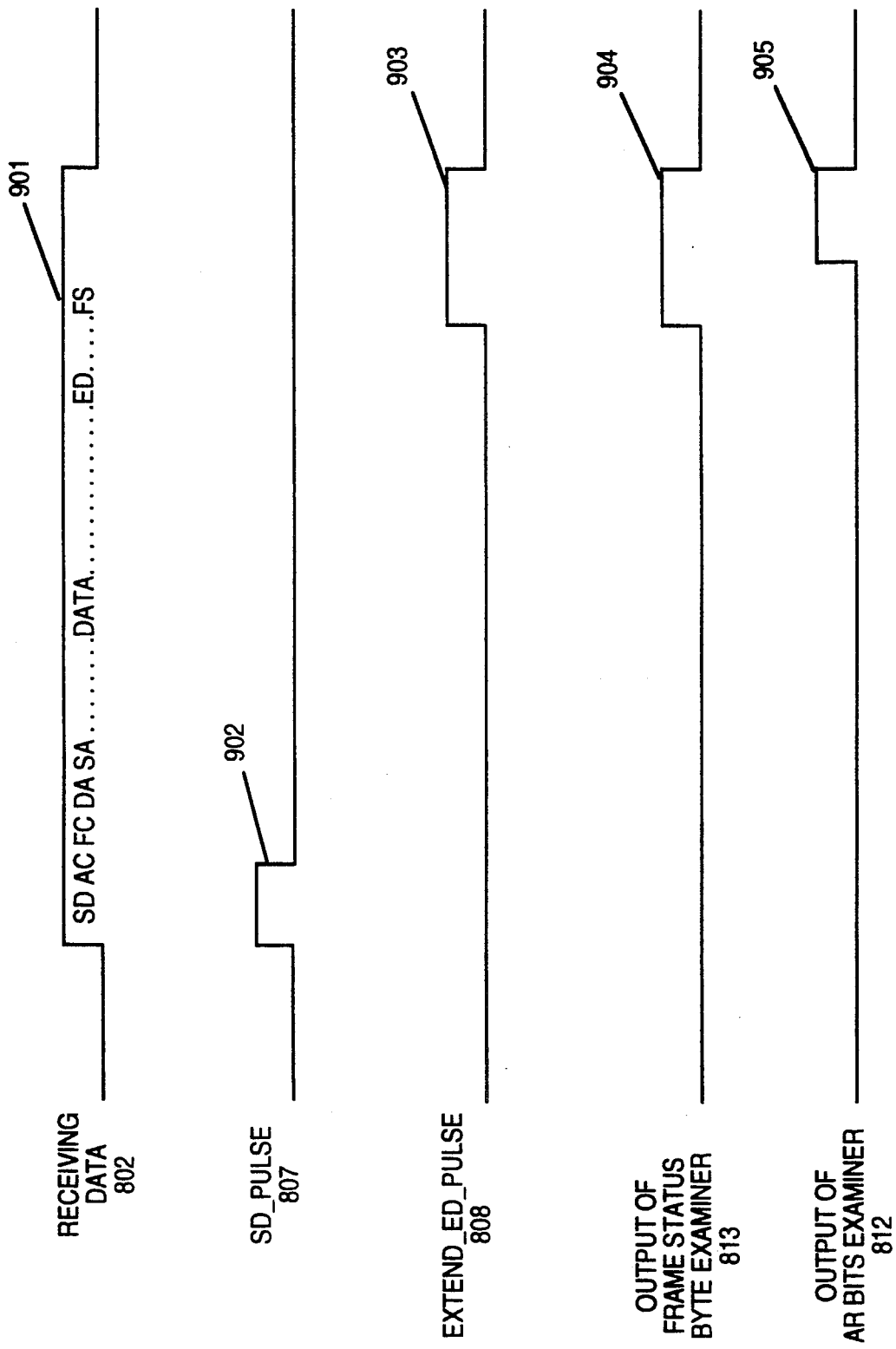

METHOD AND APPARATUS FOR IDENTIFYING PORT/STATION RELATIONSHIPS IN A NETWORK

BACKGROUND OF THE INVENTION

1. Field of the Invention

The present invention relates generally to network concentrators and more particularly, to a method and apparatus for associating Data Terminal Elements to a port on a network concentrator.

2. Description of the Related Art

It is known in the art to interconnect Data Terminal Elements (DTEs) through a common communication cable. Such interconnection provides for enhancements such as simplified transfer of information, sharing of resources and distributed functionality. A configuration of interconnected DTEs that are within a close proximity, e.g. the same building, is known as a Local Area Network (or LAN). The physical manner in which the DTEs are interconnected is termed a LAN topology. Associated with a LAN topology is a protocol. A LAN protocol refers to the format in which data is transmitted and the rules by which Data In the network is transmitted and received.

One such LAN topology is a ring topology. In a ring topology, the DTEs are successively interconnected in a daisy chained fashion to form the ring. Data transmitted through the LAN will propagate around the ring and through each of the successive DTEs.

A common protocol used in a ring topology is a token passing protocol. In a token passing protocol a token is continuously transmitted around the ring. Whenever a DTE desires access to the network for transmission of data or some other function, the token is examined to determine if some other DTE has control of the network. Through a scheme of priorities and time sharing, the various DTEs are given control of, i.e. the ability to transmit data onto, the network.

A well known example of such a network with a ring topology utilizing a token passing protocol is the token-ring, which is embodied in the American National Standards Institute/Institute of Electrical and Electronics Engineers (ANSI/IEEE) 802.5 Token Passing Ring standard.

An example of a token ring network is provided with reference to FIG. 1 which illustrates a ring-shaped communications media 103 having coupled thereto a plurality of ring interface units 102. Each ring interface unit 102 may be coupled with a DTE 101. A further description of typical components of a token-based network may be found, for example, with reference to Madron, T.W., *LANS Applications of IEEE/ANSI 802 Standards*, John Wiley & Sons, 1989 at pg. 163.

More recently network concentrators (also termed intelligent hubs) have been provided in networks in order to provide for increased connectivity, internetworking, and network management. An example of such a concentrator is the LattisNet System 3000 ™ intelligent hub available from SynOptics Communications, Inc. of Santa Clara, Calif. In a system utilizing a concentrator, each DTE is coupled with the concentrator and the concentrator provides a common communication channel, or backplane, allowing for communication between the various DTEs. This type of network, when depicted graphically, can represent a star-like image and, thus, is often referred to as a star configured network.

FIG. 2 illustrates a network as may be configured utilizing a concentrator. As illustrated by FIG. 2, a network may comprise a plurality of concentrators, such as concentrators 201 and 202. Each concentrators may have a plurality of data terminals coupled with the concentrators, such as data terminals 221-223 which are coupled with concentrators 201 and data terminals 231-233 which are coupled with concentrators 202.

The data terminals are coupled with the concentrator through one or more host modules which are housed in the concentrator. For example, data terminals 221 and 222 are each coupled with host module 241 while data terminal 223 is coupled with host module 242. The host modules provide individual ports for coupling with the data terminals.

The host modules are each coupled with a backplane bus (not shown) in the concentrator to allow communication with a repeater module, for example, repeater module 214. The repeater module is used to amplify and retransmit message packets being transmitted within the concentrator. For example, DTE 221 may transmit a message. As has been discussed above, data terminals 222 and 223 will then examine the packet to determine if the destination address of the message indicates the message is to be processed.

In addition, the concentrator may comprise a bridge or router module such as module 211 of concentrator 201. The bridge or router module allows communication of messages between DTEs which may exist in other parts of the network. As can be seen with reference to FIG. 2, concentrator 201 and concentrator 202 are coupled in communication through bridge/router 211 which is on concentrator 201 and bridge/router 212 on concentrator 202 to allow messages to be communicated from DTEs 221-223 coupled with concentrator 201 to DTEs 231-233 coupled with concentrator 202.

Port-Station Association

In some instances, a single physical attachment to the network concentrator will allow a plurality of DTEs to be coupled into the network. For example, in the case of a remote bridge, the single remote bridge coupling may incorporate multiple DTEs coupled to the corresponding concentrator on the remote end of the bridge, to be coupled into the network. In a similar manner it would be desirable to allow more than one DTE to be coupled to a port on the network concentrator.

In order to maintain proper management and security of the network, a means for recognizing the physical connection, e.g. the port, to which a DTE is connected to the network, is necessary. Such a port/station association is important in the event one or more DTEs must be partitioned from the network. This may arise, for example in a situation where a particular DTE, or set of DTEs are deteriorating network performance through excessive use. Such an instance may arise if the DTEs are constantly transmitting data onto the network. In such a situation, it may be desirable to partition such offending DTEs off of the network.

A second instance may arise with respect to network security. For example, if a DTE is performing an unprivileged data access to/from another DTE, it may again be desirable to partition the offending DTE off the network.

The requirement of a port/station association may cause restrictions in the implementation of a network concentrator. For example, it is common for a concentrator to have a restriction where a port may only have one station connected to it. Further, the need for port/station association has often complicated the installation of new stations onto the network. Finally, it is desirable that such a means be dynamic, namely that the port/station association may occur while the network is in operation, rather, than being a static process (e.g. loading a pre-defined table).

Thus, it is a primary object of the present invention to provide a means by which stations may be dynamically associated to a particular port on a network concentrator which in turn would allow for multiple stations to be connected to a single port on a concentrator.

SUMMARY

A method and apparatus for identifying data terminal elements (DTEs) connected to a port on a network concentrator, is described. It is often desirable to have more than one DTE connected to a port on a network concentrator. However, a problem of associating a DTE with a particular port arises. It is necessary to be able to determine which port a DTE is connected to in order to perform network management and security functions. The method and apparatus of the present invention is practiced on a network utilizing a ring topology with a token based data transmission protocol.

The method of the present invention provides for identification of exit station addresses of DTEs connected to a port. An exit station is defined as the DTE which directly transmits data into a port on a network concentrator. A circuit on the port will detect if a transmission through the port is one that contains certain transmission status information. Namely, certain information regarding the address of the DTE initiating the transmission and information identifying the sending DTE as an exit station.

Further utilized in the present invention are tables which identify the sequence of DTEs, namely a station map, and the sequence of the ports, namely a port map. With this information, the DTEs associated with a particular port may typically be identified by identifying the previous port, identifying the exit station for the previous port and identifying the DTE(s) between the exit station of the previous port and the exit station of the current port.

BRIEF DESCRIPTION OF THE FIGURES

FIG. 3b is a logical layout of the ring topology for the DTEs illustrated in FIG. 3a.

FIG. 9 is a timing diagram of the major signals of the circuit of FIG. 8.

DETAILED DESCRIPTION OF THE PREFERRED EMBODIMENT

What is described herein is a method and apparatus for associating Data Terminal Elements (also known as DTEs or stations) with a particular port in a token-ring based Local Area Network (LAN) that is implemented on a network concentrator. Said method and apparatus are as described in Disclosure Document No. 299994. It should be noted that the terms "DTE" and "station" may be used interchangeably. In the following description, numerous specific details, e.g. a description of the IEEE 802.5 token-ring standard, are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

The present invention enables dynamic identification of station coupled to a port on a network concentrator. Such a feature enhances the capability of a network concentrator by allowing more than one station to be coupled to a port. The need to associate stations to a particular port is needed in order to perform various system management and security functions.

OVERVIEW OF THE CONCENTRATOR OF THE PREFERRED EMBODIMENT

Figure 1:
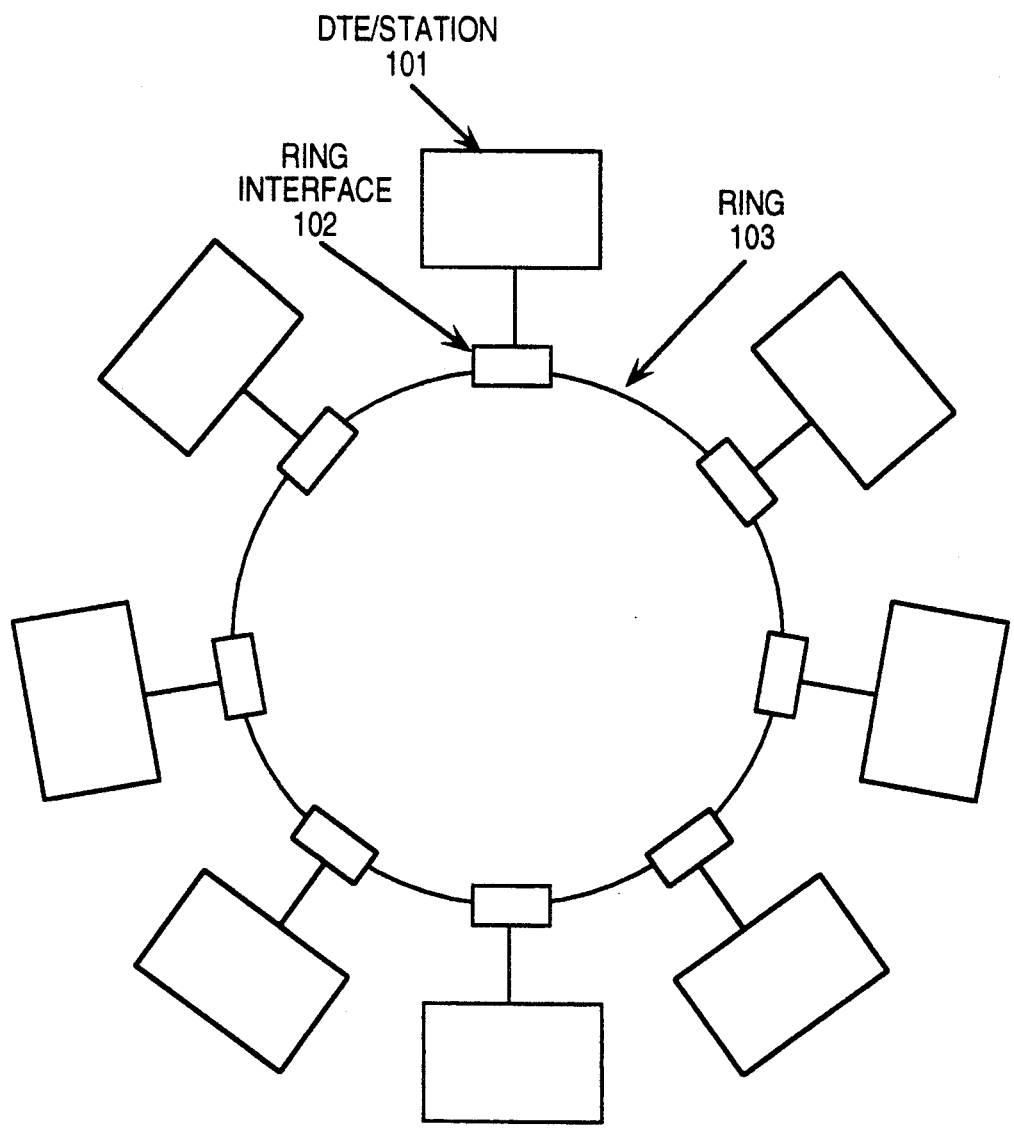
FIG. 1 is an example of a token ring network.
Figure 2:
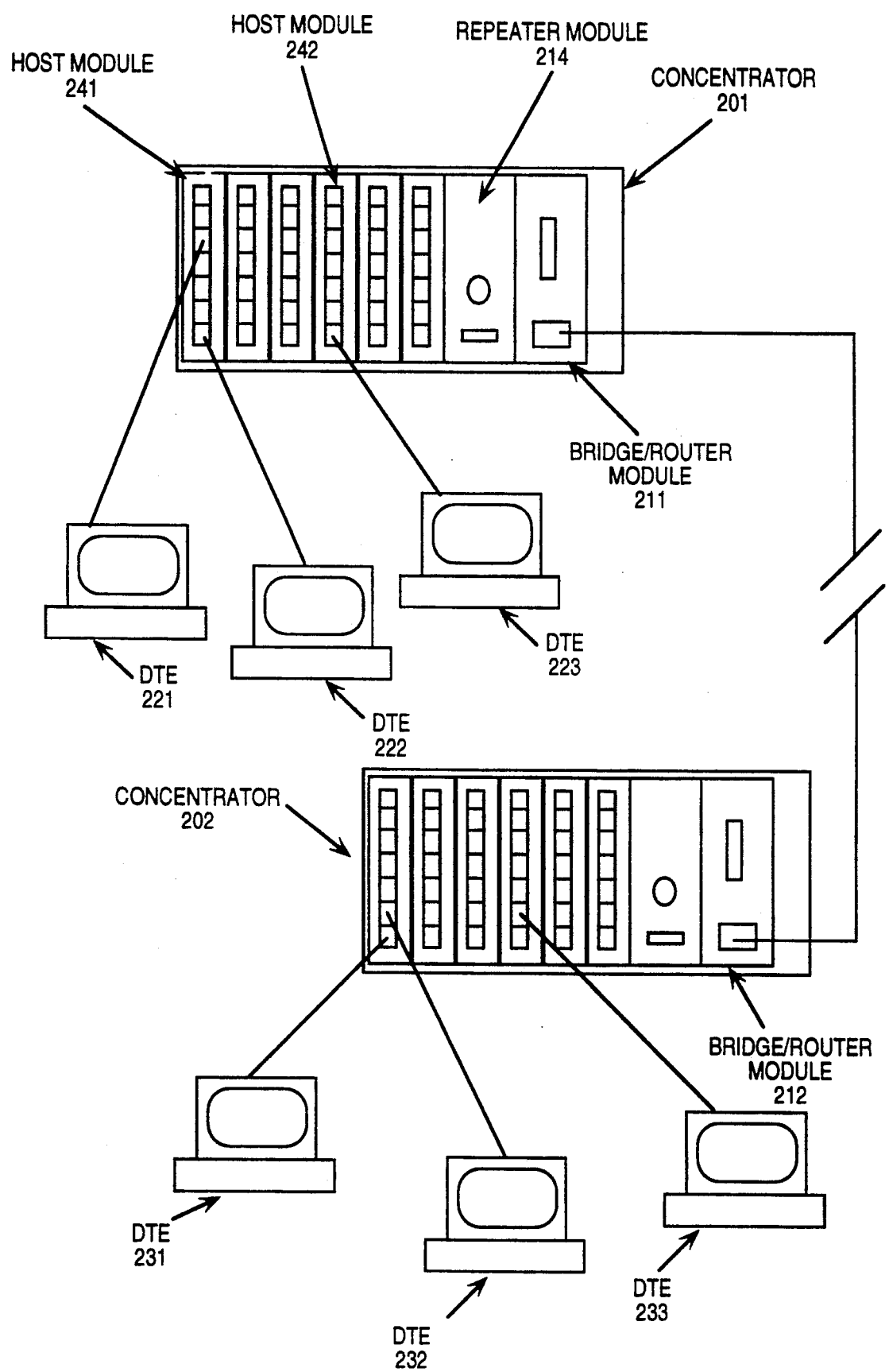
FIG. 2 illustrates a network as may be configured utilizing a network concentrator.
Figure 3A:
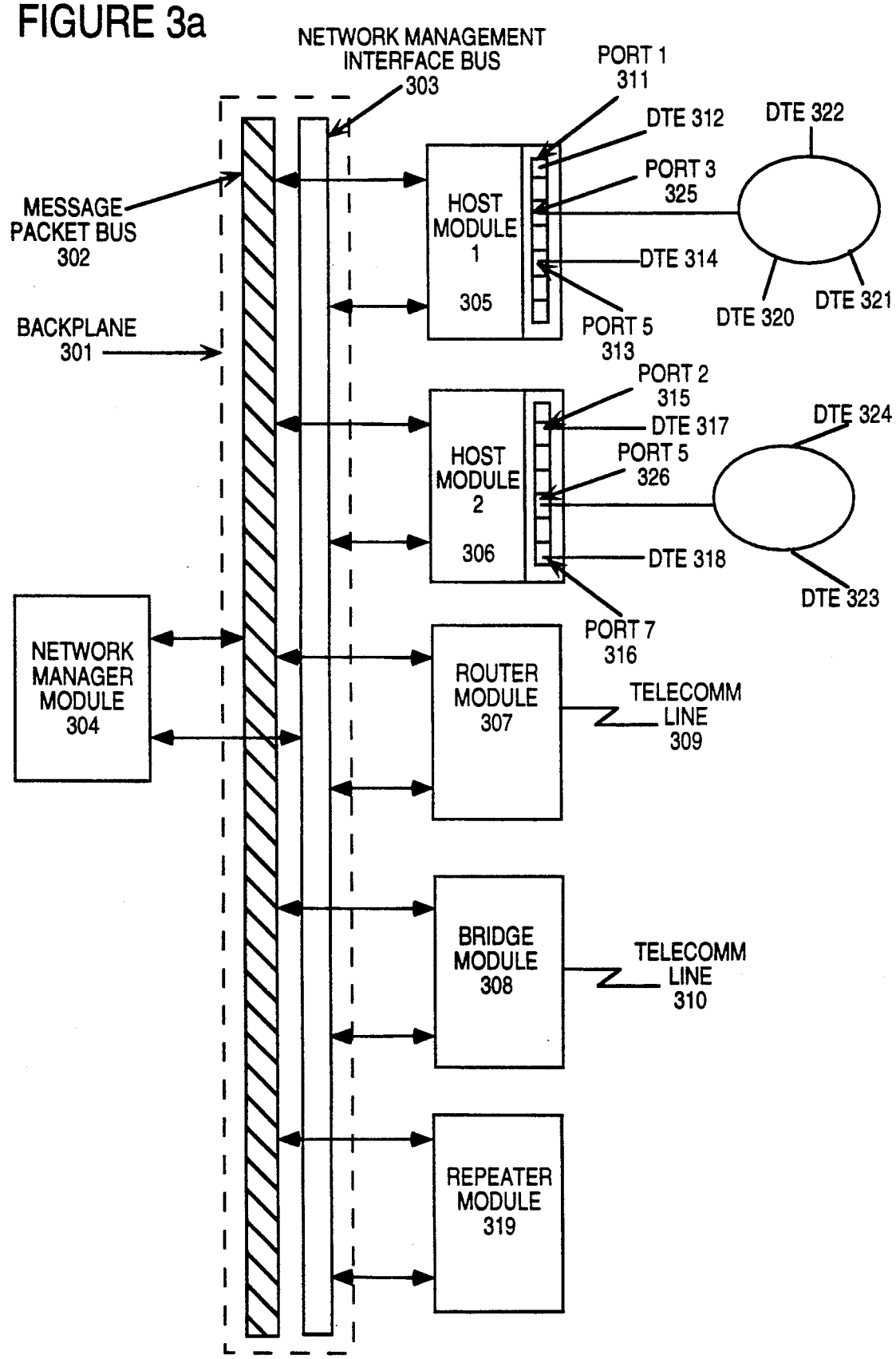
FIG. 3a is a block diagram of a network concentrator as may be utilized by the preferred embodiment of the present invention.

FIG. 3a is a functional block diagram of a concentrator in the preferred embodiment. DTEs are coupled to ports defined by a host module. Here DTEs 312 and 314 are coupled to port 1 311 and port 5 313 respectively of host module 1 305. Similarly, DTEs 317 and 318 are coupled to port 2 315 and port 7 316, respectively of host module 2 306. The preferred embodiment of the present invention provides for multiple DTEs to couple to the network through a single port on a host module. This is illustrated in FIG. 3a at port 3 325 on host module 1 305 and again at port 5 326 on host module 2 306. Coupled to port 3 325 are DTEs 320–322. Note that in this instance, the DTEs 320-322 are sequentially connected to each other and, to and from the port 3 325, as a ring. Similarly, the DTEs 323 and 324 are coupled to port 5 326 of host module 2 306 as a ring.

Also incorporated within the concentrator is a network manager module 304, a router module 307, a bridge module 308 and a repeater module 319. The network manager 304, router 307 and bridge 308 are typically optional modules whose use depends on the network configuration. The repeater module 319 is used to amplify and retransmit electrical signals comprising the message packets being transmitted within the concentrator. The network management module 304 may be used to gather network traffic statistics, and perform other network management functions. The router 307 and bridge 308 are coupled to telecommunication lines 309 and 310, respectively, and are used for coupling to other portions of the network.

The various modules within the concentrator are inserted into slots of the concentrator and are coupled together via a backplane 301. Slots define the means, both electrically and physically, by which a module is coupled to the concentrator. The slots will typically have a pre-defined address, e.g. slot 1, slot 2, etc. For example, with reference to FIG. 3a, the host module 1 305 would be inserted into slot 1, the host module 2 306 would be inserted into slot 2, the router module 307 would be inserted into slot 3, the bridge module 308 would be inserted into slot 4 and the repeater module 319 would be inserted into slot 5.

The backplane bus 301 is comprised of a message packet bus 302 and a network management interface bus (NMI) 303. It is through the message packet bus 302 that messages are transmitted between the various modules in the concentrator. It is important to note that the network management module 304 is also coupled to the message packet bus 302. The network management interface bus 303 is used for network management communication between host modules 305 and 306, router 307, bridge 308 and the network management module 304. Further, the network management module 304 will typically include a processor. The processor in network management module 304 will perform various processing functions, e.g. building tables and table look-up that are described herein.

The host modules typically are designed to support a single type of communication media and method—for example, Ethernet, Ethernet fiber optic, 50-pin 10BASE-T, Ethernet 10BASE-T, Token ring shielded twisted pair, or Token ring unshielded twisted pair. Although various host modules may be intermixed within a single concentrator, the preferred embodiment is described in reference to a token-ring concentrator, wherein only token-ring host modules are coupled.

Figure 3B:
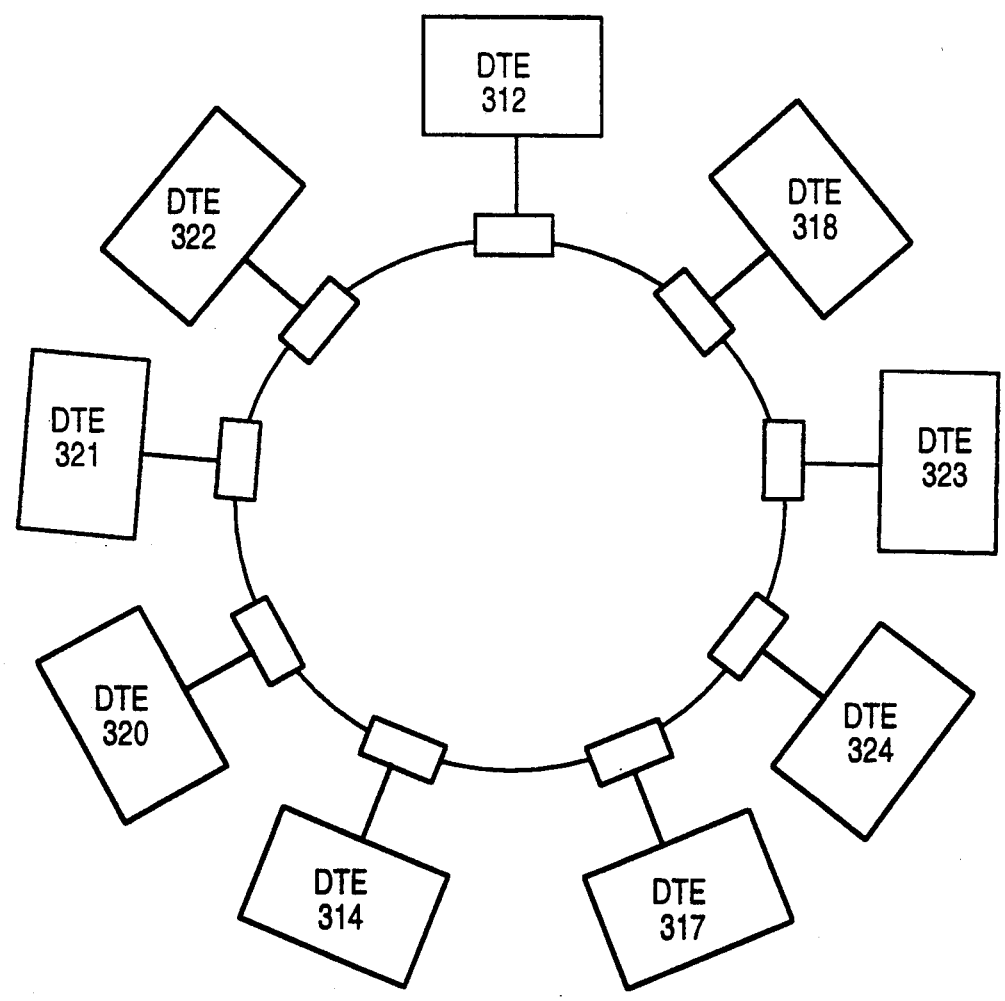

Finally, it should be noted that the token path for a network as in FIG. 3a would run from the first port of the first host module to the last port on the last host module and then loop back to the first port of the first host module. Further, the path would run counter-clockwise through rings coupled to ports. The token path of DTEs in FIG. 3a is illustrated in FIG. 3b.

Interconnection topology of the Network of FIG. 3a and a Description of Reference Tables and other terminology What is now discussed is certain terminology to be used in the description of a currently preferred embodiment. A section is defined as a segment on the token path. A section is comprised of either no stations, one station or more than one station. In the concentrator architecture of the preferred embodiment a section is comprised of the station(s) connected to a port. A null section is a section with no stations on an associated port.

An entrance station is the first station of a section. This is equivalent to the first station that would handle a communication transmission as it leaves a port.

An exit station is the last station of a section. This is equivalent to the station that transmits a communication transmission back into a port.

A token is a communication transmission that propagates through the ring during operation. The token contains information as to whether another station has control of the ring.

A frame is a communication transmission in a predefined format. Moreover, it often refers to the format, or protocol, in which data is transferred through the network.

For the sake of simplicity and ease of explanation, it is assumed that the network under consideration consists of the DTEs illustrated in FIG. 3a (namely, the network will not include DTEs coupled via the remote bridge or routers). In a ring-based topology, the interconnection of the various DTEs would be as illustrated in FIG. 3b. Referring to FIG. 3b, it is shown that the DTEs are interconnected as one physical ring. A token would encounter the various DTEs sequentially in a counter-clockwise direction. The network concentrator provides the conduit paths for the electrical signals to be received/transmitted by the respective DTEs. Of particular note are the DTEs 320-322. As noted with reference to FIG. 3a, the DTEs 320-322 are coupled to the same port (thus comprising a section). As the data signals are transmitted in a counter-clockwise fashion around the ring, the sequence in which the DTEs 320-322 on the ring would receive a communication transmission is in the counter-clockwise order, namely DTE 322, DTE 321 and DTE 320.

It should be further noted that the network concentrator connects each of the ports in a serial fashion, so that, for example, port n is coupled to port n+1. Thus, a DTE (or set of DTEs) coupled to a port n will be connected in sequence to the DTE (or set of DTEs) coupled to port n+1. The last port on the network concentrator would then be coupled to the first port of the network concentrator.

Figure 3C:
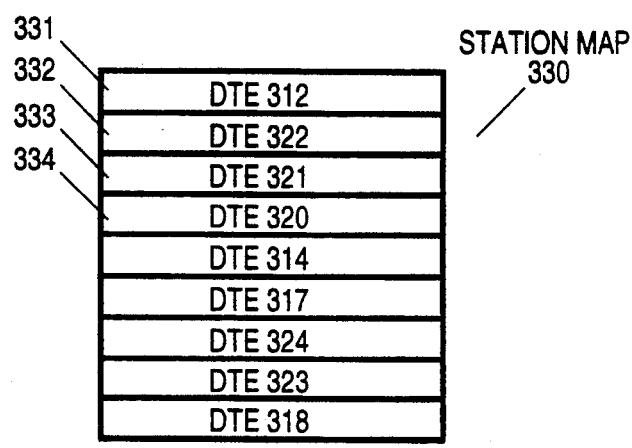
FIG. 3c illustrates a station map for the network topology of FIG. 3b.

In the currently preferred embodiment of the present invention, three reference tables are used; a station map, a port map and an exit station map. Each of the station map, port map and the exit station map may be stored in a control storage area of the network concentrator. A station map describes the logical topology of the network. A station map corresponding to the LAN topology of FIG. 3b is illustrated in FIG. 3c. A station map 330 indicates the sequential order of the DTEs on the network. Note that the sequence of the DTEs in the station map 330 corresponds to the order in which a frame or token would be received within the ring structure. The sequence will start with a DTE coupled to port 1 of the host module inserted into slot 1 of the concentrator. The sequence will continue with the next port and then to the ports defined by the next host module, etc.

Figure 3D:
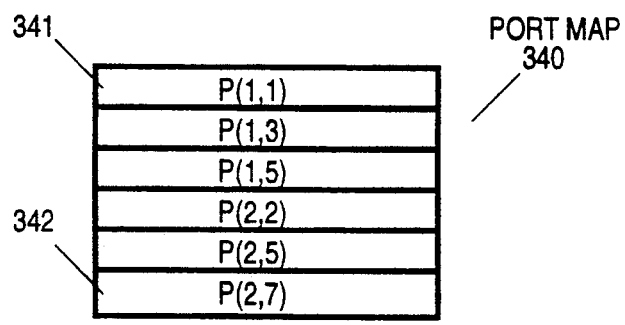
FIG. 3d illustrates a port map for the network illustrated in FIG. 3b.

The physical topology of the network is defined with reference to a port map. The port map describes a set of ports that are on the communication path. A port will be included in the port map if it has a DTE coupled to it (i.e., it is not a null section). As was illustrated in FIG. 3a, not all ports on a host module will have DTEs connected to it. A port map corresponding to the network of FIG. 3b, is illustrated in FIG. 3d. The format used here to denote a port in the port map 340 is P(slot number, port number). So, here for example, the entry 341 P(1,1) means that the port 1 at slot 1 has DTEs coupled to it. Similarly, the entry 342 P(2,7) means that the port 7 at slot 2 has DTEs coupled to it. As in the case of the station map, the port map lists the ports in the sequence in which they would be encountered by a frame or token.

Figure 3E:
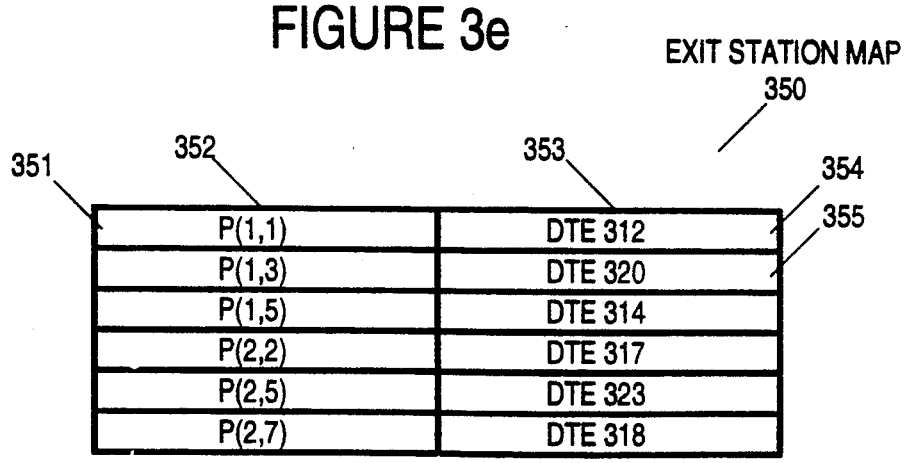
FIG. 3e illustrates a port exit station map for the network illustrated in FIG. 3b.

The exit station map identifies DTEs which transmit a frame or token into a port. In the case where a single DTE is coupled to a port, the exit station is simply the single DTE coupled to the port. In the case where multiple DTEs are coupled to a port, it is the DTE which directly transmits to the port. So referring briefly to FIG. 3a, the DTE 320 is the exit station for the port 3 325. FIG. 3e illustrates an exit station map corresponding to the network of FIG. 3b. Here, the exit station map 350 has entries in a sequence and number corresponding to a port map. A first column 352 identifies the enabled port and a second column 353 identifies the corresponding exit station. So for example, entry 354 indicates that for port 1 in slot 1, the exit station is DTE 312. Similarly, entry 355 indicates that for port 3 in slot 1 the exit station is DTE 320.

The port map and the station map are constructed using techniques that are well known to those skilled in the art. Thus, no further description of the construction of the port map and station map is deemed necessary. The construction of the exit station is described in greater detail below.

As will be described in greater detail below, the port map is used to build the exit station map. The exit station map is used with the station map to perform port station association.

Port/Station Association Method of the Preferred Embodiment

The port/station association method of the preferred embodiment utilizes the station map, port map, and the exit station map to derive a set of DTEs that are associated with a particular port. The steps for identifying the stations associated with a port are:

1. Identify the desired port in the exit station map and acquire the desired port exit station.
2. Identify the upstream port to the desired port from the exit station map and acquire the upstream port exit station.
3. Identify the upstream stations between the desired port exit station and the upstream port exit station.

The results of the third step are the stations coupled to the desired port.

As an example, with reference to FIGS. 3c and 3e, suppose it is desirable to identify the DTEs associated with port 3 in slot 1, i.e. entry 355 of the exit station map 350 of FIG. 3e. First, the exit station for the entry 355 is identified as DTE 320. Next, the exit DTE for the upstream port, is identified. In this example, the upstream port is found in entry 354 of exit station map 350. So, the exit station for the upstream port is DTE 312. Referring now to FIG. 3c, the respective exit stations are located in the station map 330. In station map 330, the entry 331 contains the DTE 312 and the entry 334 contains the DTE 322. Between the entry 331 and the entry 334 are the entries 332 and 333, referring respectively to DTE 322 and DTE 321. As the station map 330 indicates that the DTE 312 is on an adjacent port to the DTE 320, the entries 332 and 333 must be on the same port as the DTE in entry 334. Thus, the DTE 322, DTE 321 and DTE 320 are all on the same port. This can be quickly verified by referring to FIG. 3a.

Figure 3F:
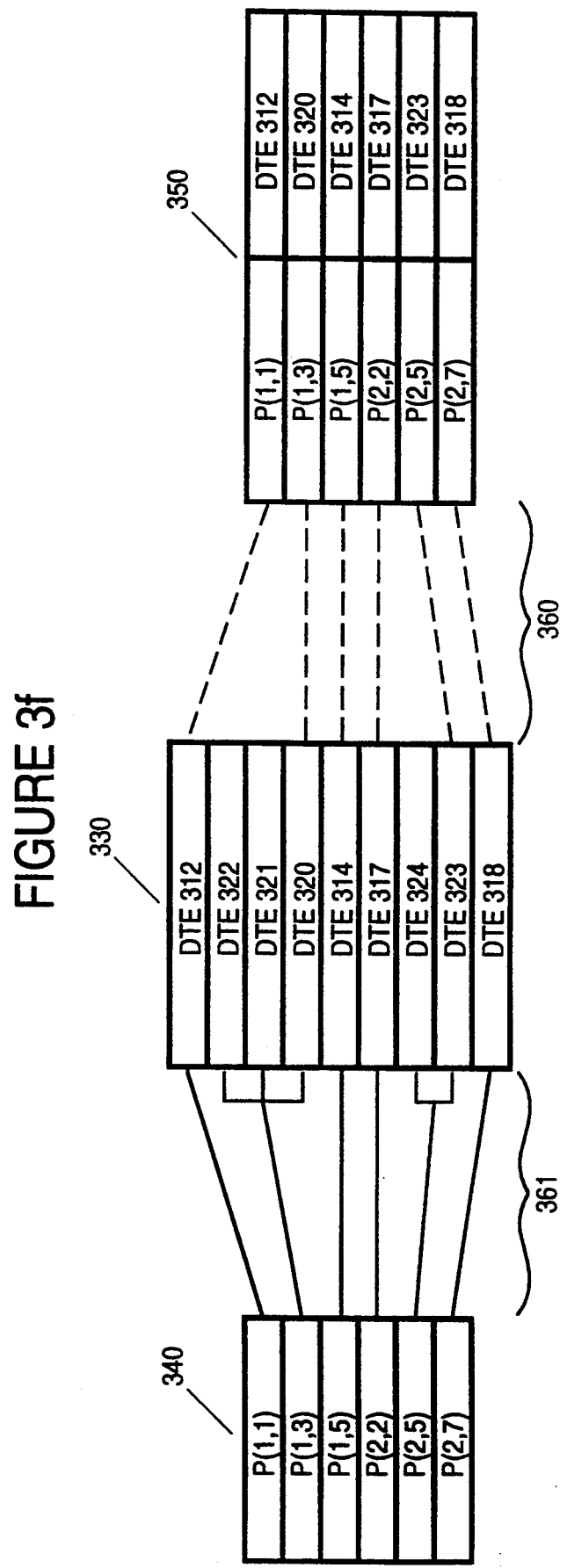
FIG. 3f illustrates, the relationships between the station map, port map and exit station map and how they are used to associate stations to ports in the preferred embodiment of the present invention.

The port station association of the present invention for the ports in the network is further illustrated in FIG. 3f. Here the station map is illustrated with the exit station map and the port map. The exit station map and station map relationships are identified by the dashed lines 360. The port map and station map association is identified by the solid lines 361. Again, this can be verified by a comparison of the network of FIG. 3a.

The method and apparatus of the present invention supports a class of DTEs known as SNIFFERS. A SNIFFER is a network analysis device. Typically a SNIFFER is the only device on a port. The exception arises because the SNIFFER is identified as a station in the station map and the port to which it is coupled is a port in the port map. However, a SNIFFER does not participate in a Ring Poll, and thus does not modify the A Bits in the AMP/SMP multicast frame. As will become apparent in the description of the generation of the exit station map, this is data that is checked in order to identify an exit station. The result is that, the exit station map is created with a single DTE being identified as the exit station for multiple ports. This would cause an incorrect association of stations and ports (because the SNIFFER device would be erroneously included as associated with a port).

Figure 3G:
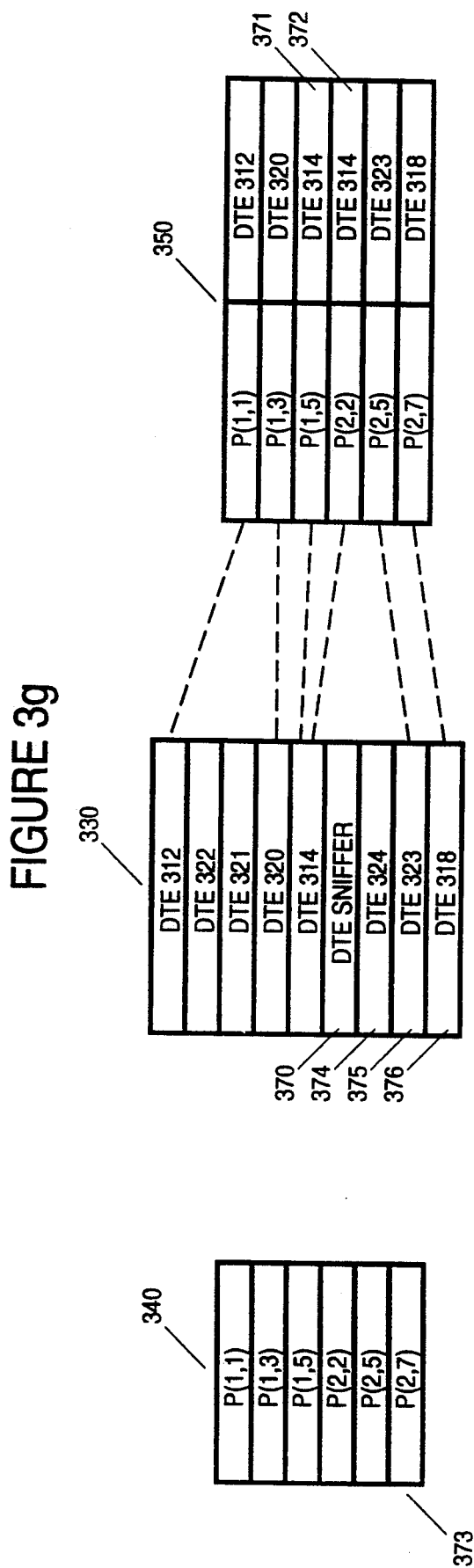
FIG. 3g illustrates a station map, port map and exit station map when a SNIFFER station is included in the network.

Such an incorrect association that would result is illustrated with reference to FIG. 3g. In FIG. 3g, a station map 330, the exit station map 350 and port map 340 are illustrated. Of particular note are the existence of the DTE SNIFFER entry 370 and the entries 371 and 372 of the exit station table 350. The entries 371 and 372 both identify the DTE 314 as the exit station for the corresponding port. As noted above, this is because the SNIFFER port does not participate in a Ring Poll during network operation.

The resulting error in port station association is illustrated with reference to the station map 330 and port map 340. Here, the desired port is in entry 373 of the port map, namely P(2,7). Utilizing the port association method as described above, the result would be that the stations in entries 370 and 374–376 of the station map would be associated with the port P(2,7). This would include the DTE SNIFFER entry 370, which is not on port P(2,7). Moreover, the port to which the SNIFFER device is coupled would be treated as if it were the immediately preceeding upstream port. Here, the station coupled to port P(2,2) would be identified as DTE 314, rather then DTE SNIFFER.

To avoid such an error, a simple check for duplicate exit station entries is made. Such duplicate exit station entries indicate the existence of a SNIFFER port. When such duplicate exit station entries are identified, it is known that the entry in the station map immediately proceeding the upstream port exit station is a SNIFFER station. accordingly, it should not be associated with the desired port being examined.

Figure 4:
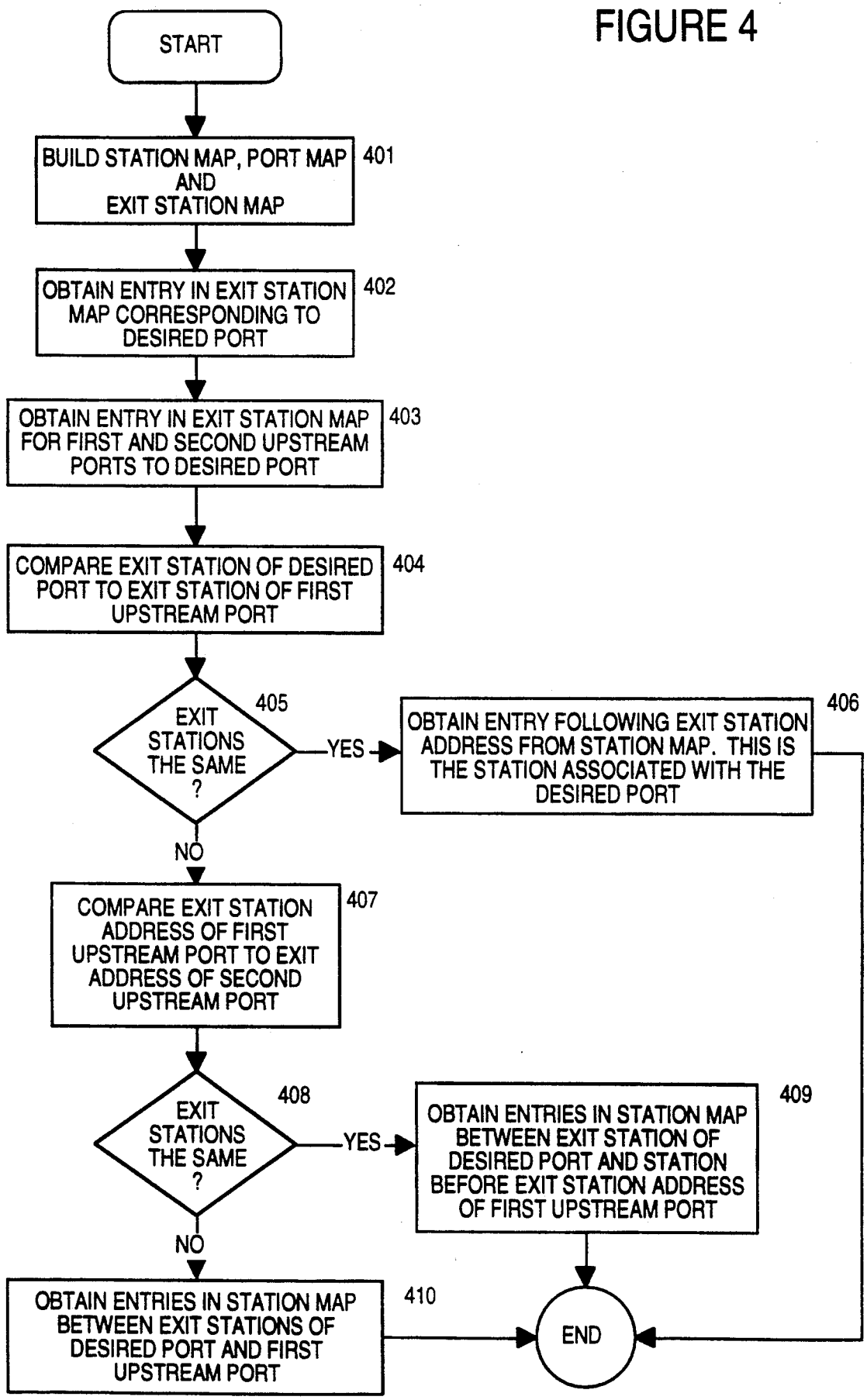
FIG. 4 is a flow chart which illustrates the basic method of port station association, as performed by the currently preferred embodiment of the present invention.

FIG. 4 illustrates the basic method for Port Station Association as performed in the currently preferred embodiment of the present invention. First, the port, station and exit station entry maps are built, step 401. As noted above, the port and station maps are built using techniques that are known in the art. The building of the exit station entry map is described in more detail below.

With this information, port station association may be performed. When a request for identification of the stations coupled to a port is made, the entry in the exit station table corresponding to the desired port is obtained, step 402. Next, the entries in the exit station table which contain the exit stations for the first and second upstream ports are obtained, step 403. As was described above, the exit stations for the two (2) upstream ports is made because of the possibility of the first upstream port having a SNIFFER device coupled to it.

A second possibility is that the desired port has a SNIFFER device coupled to it. To check for this, the exit station address of the desired port is compared to the exit station address of the first upstream port, step 404. A check is then made to determine if the exit stations are the same, step 405. If the exit station addresses are the same, the desired port is coupled to a SNIFFER device. The entry following (i.e. downstream) of the exit address for the desired port is obtained from the station map and identified as the station associated with the port, step 406.

If the exit station addresses are not the same, then a comparison is made between the exit stations for the first and second upstream ports, step 407. A check is then made to determine if the exit stations are the same, step 408. If the exit stations are the same, then a SNIFFER device exists at the first upstream port. In this case, the entries in the station map between the exit station of the desired port and the station before the listed exit station for the first upstream port are obtained and identified as associated with the desired port, step 409. If the exit stations are not the same, the entries in the station map between the exit stations of the desired port and the first upstream port are obtained and identified as associated with the desired port, step 410.

The list of stations associated with a port may be generated once, at network start-up time, or may be generated dynamically when the information is needed. Either, implementation would be apparent to one skilled in the art.

Generation Of The Exit Station Map

Of particular interest is the creation of the exit station map. Generating and creating a station map and a port map are tasks that are known in the art, often as a network management function. However, the exit station map is not generally provided. In the preferred embodiment, identification of an exit station occurs directly at the port. Prior to describing generation of the station map, a description of relevant aspects of the IEEE 802.5 standard, is instructive.

IEEE 802.5 Token Passing Ring Standard

As noted above, the LAN topology is distinguished from the protocol used for the transmission and receipt of data. The preferred embodiment of the present invention is designed for use on systems utilizing the IEEE-/ANSI 802.5 Token-Passing Ring standard. The IEEE-/ANSI 802.5 standard is discussed in detail in the aforementioned publication entitled "*LAN Applications of IEEE/ANSI 802 Standards*", Thomas W. Madron, Wiley (1989), pgs. 147-167. However, it would prove instructive here to discuss briefly the 802.5 standards and certain data elements and their formats. It should be noted that it would be apparent to one skilled in the art that the present invention is not limited to networks with ring topologies utilizing the 802.5 standard. Other standards that provides certain information, as will be discussed below, could be utilized without departure from the spirit and scope of the present invention.

As is known to those skilled in the art, the 802.5 standard defines a Media Access Control (MAC) protocol and a physical media protocol. In a layered network architecture, e.g. Open System Interconnect Architecture, these are often termed the data link layer and the physical layer. The present invention operates in a manner independent of the physical layer, thus discussion of the physical media protocol is not deemed necessary. The present invention interrogates the status of certain information that is defined within the MAC protocol to identify exit stations for a port. This information is found in a MAC Control Frame.

Multicast Frames

During the course of operation of the network, each station will learn the identify of it's upstream neighbor station (i.e. the station from which it receives a frame or token). This occurs through the process of sending out multicast frames, namely Active Monitor Present (AMP) frame or, alternatively, a Standby Monitor Present (SMP) frame. Such a process is commonly referred to as a Ring Poll. The first station transmitting in such a ring poll will transmit on AMP frame. Subsequent station will transmit the AMP frame as well as transmitting a SMP frame. An AMP or SMP frame will be transmitted by a station with a predetermined set of bits in the frame set to zero. Each downstream station upon receipt of the AMP or SMP frame will check the predetermined set of bits to determine their value. If the bits are set to zero, they know that the AMP or SMP frame originated from the upstream neighbor station. The receiving station will then set the predetermined set of bits to a one value and extract the source address contained in the AMP or SMP frame. This source address is the address of the upstream station from which the frame was transmitted.

Figure 5:
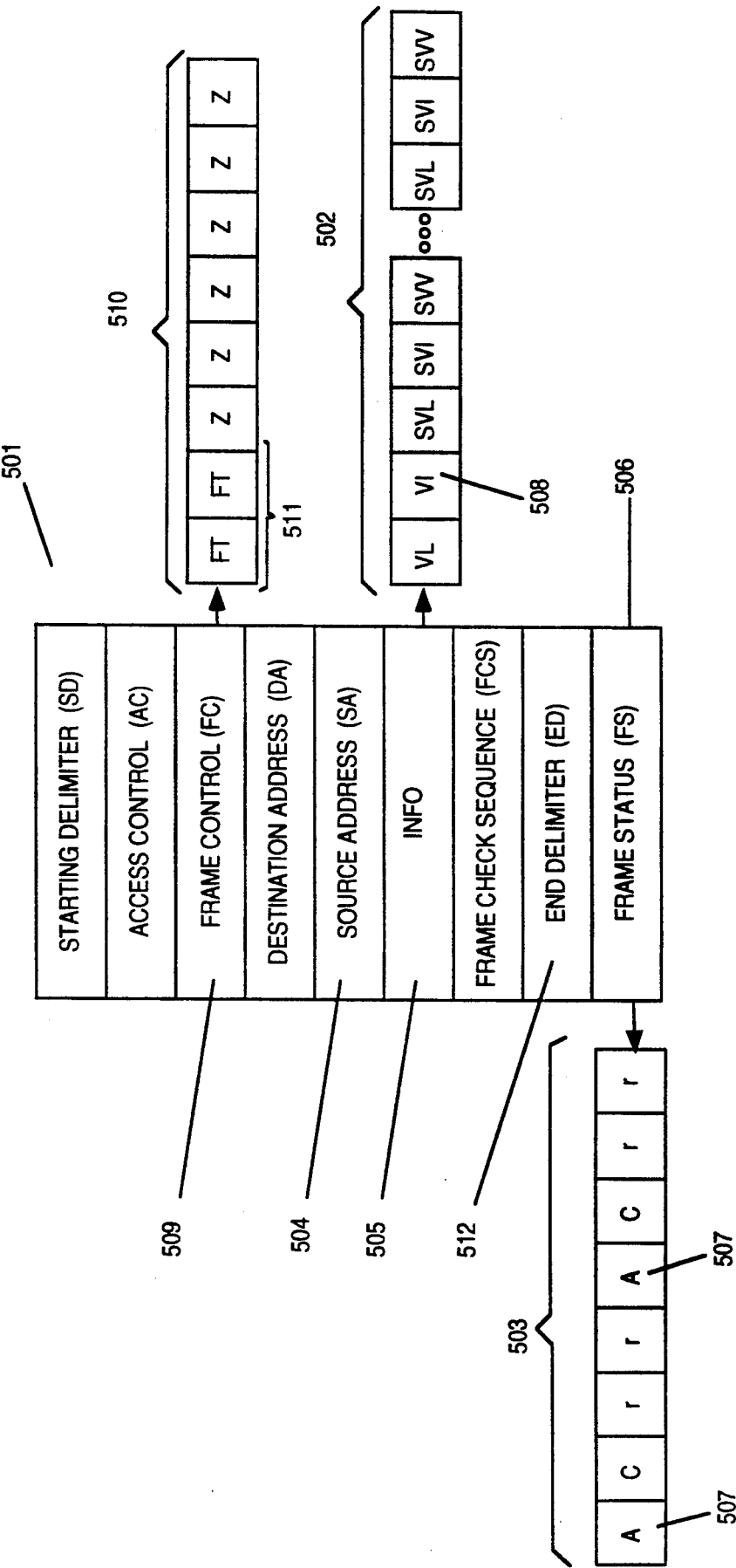
FIG. 5 is a description of a media access control (MAC) frame layout, including the organization of the Info field the Frame Status field and the Frame Control field.

FIG. 5 illustrates the MAC frame format, and the organization of certain fields in the MAC frame format which are used by the present invention. Referring to FIG. 5, a MAC frame 501 is illustrated. The organization of the MAC frame is well known to those skilled in the art, so attention will be focused on the particular fields that are utilized within the present invention. As noted above, the frame used in the present invention is termed a multicast frame. A multicast frame is a MAC control frame. A Frame Control (FC) field 509 is used to identify a MAC control frame. The layout 510 of Frame Control field 509 includes Frame Type bits 511. When Frame Type bits 511 each contain a zero (0) value, the frame is a MAC control frame.

A multicast SMP frame can be identified by inspecting the INFO field 505 of MAC frame 501. For a general data transmission, placing Data in the INFO field 505 is optional. However, when there is Data In the INFO field 505, that data is termed a vector. The vector will typically have some functional significance. A vector layout 502 of INFO field 505 is illustrated in FIG. 5. Of particular interest is the Vector Identifier (VI) field 508. The VI field 508 identifies the type of frame it is (i.e. the function that the frame is performing). As noted above, it is the broadcast frames which are being looked for. A broadcast frame will be identified with a VI field 508 having a hexidecimal value of 0005 Active Monitor Present (AMP) or hexidecimal value of 0006 Standby Monitor Present (SMP).

Further in the MAC frame 501 is a Frame Status (FS) field 506. The FS field 506 provides status information concerning the transmittal of the frame. FS field layout 503 shows the information in the FS field. Of particular interest are the Address Recognized bits (A) 507. The DTE that originally transmits a multicast frame will do so with the A bits 507 set to a logical zero (0) value. The first DTE to receive the frame will change the A bits 507 to a logical one (1) value.

The End Delimeter field 512 contains a bit which may be set if the frame or token being transmitted contains an error. If such an error exists, the data in the communication transmission has been corrupted accordingly, the data should be ignored.

The final field in MAC frame 501 that is of interest is the Source Address (SA) field 504. It is this source address field which identifies the DTE which originally transmitted the frame.

Determining the Exit Station for a Port

Figure 6A:
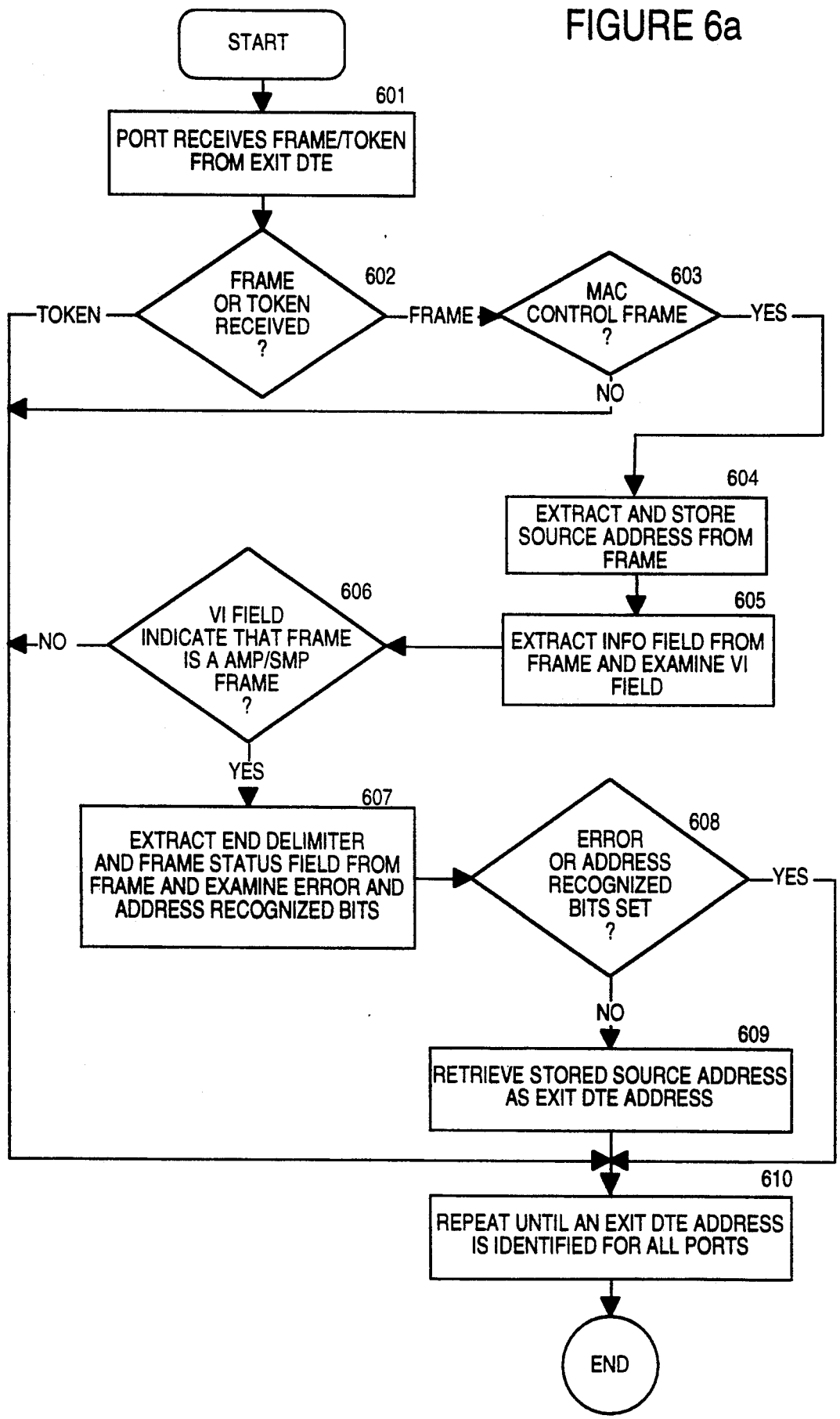
FIG. 6a is a flow chart illustrating the steps needed to identify an exit DTE address for a particular port.

FIG. 6a is a flow chart illustrating the method for determining an exit station DTE address as implemented in the preferred embodiment. It should be noted that the method of the preferred embodiment does not disrupt the flow of the tokens and frames. The processing occurs without "holding" the tokens or frame for processing. First, a port receives a frame or a token from an exit DTE, step 601. As a port is continually receiving both frames and/or tokens, a distinction must be made as to whether or not a frame or token is received. So, the determination of whether a frame or token is received occurs next, step 602. Distinguishing between a frame or token is a well known task that is performed continually by the DTEs in the network. Typically, the distinction between the frame or the token can be found in the data format of the frame or token. In any event, an exit DTE address for the port cannot be identified if a token is received. If a token is received, it will ignore and wait for the next communication transmission. A check is then made to determine if the frame received is a MAC control frame, step 603. As described above, this is accomplished by examining the Frame Type bits of the frame control field. If it is not a MAC control frame, the frame is ignored and the next communication transmission is looked for.

If a MAC control frame is received, the source address which identifies the origin of the frame is extracted from the frame and stored, step 604. This source address may potentially be the exit station address. Next, the Info field from the MAC control frame is extracted and the VI field is examined, step 605. Recall that in the IEEE 802.5 standard, the Info field is optional, and that the VI field within the Info field contains the identifier for the type of frame that has been transmitted. It is then determined whether or not the VI field indicates that the frame is a multicast AMP/SMP frame, step 606. If the frame is not a multicast AMP/SMP frame, the method terminates processing for the frame and the port waits for the next communication transmission.

Assuming the frame now is a multicast AMP/SMP frame, the End Delimeter and Frame Status fields are extracted and the error and address recognized bits are examined, step 607. Recall that the address recognized (A) bits are set to zero (0) by the transmitting DTE and are reset to one (1) by the first downstream DTE that receives the frame. This allows the receiving DTE to know the identity, via the source address in the frame, of its neighboring upstream DTE. In any event, it is then determined whether or not the error bit or the addressed recognized (A) bits are set to 1, step 608. If the error bit or the addressed recognized bits are set to 1, then the transmitting DTE is not the exit station, and the port terminates processing and waits for the next frame or token. If the error bits or the address recognized bits are not set, i.e., they are equal to 0, the stored source address is retrieved and identified as the exit station address for that port, step 609. This is performed by each enabled port until all the exit DTE addresses are identified for all the ports, step 610.

Note that the method described in FIG. 6a is primarily for an individual port, identifying its exit station. This method will be performed by each port in order to recognize its corresponding exit station.

Figure 6B:
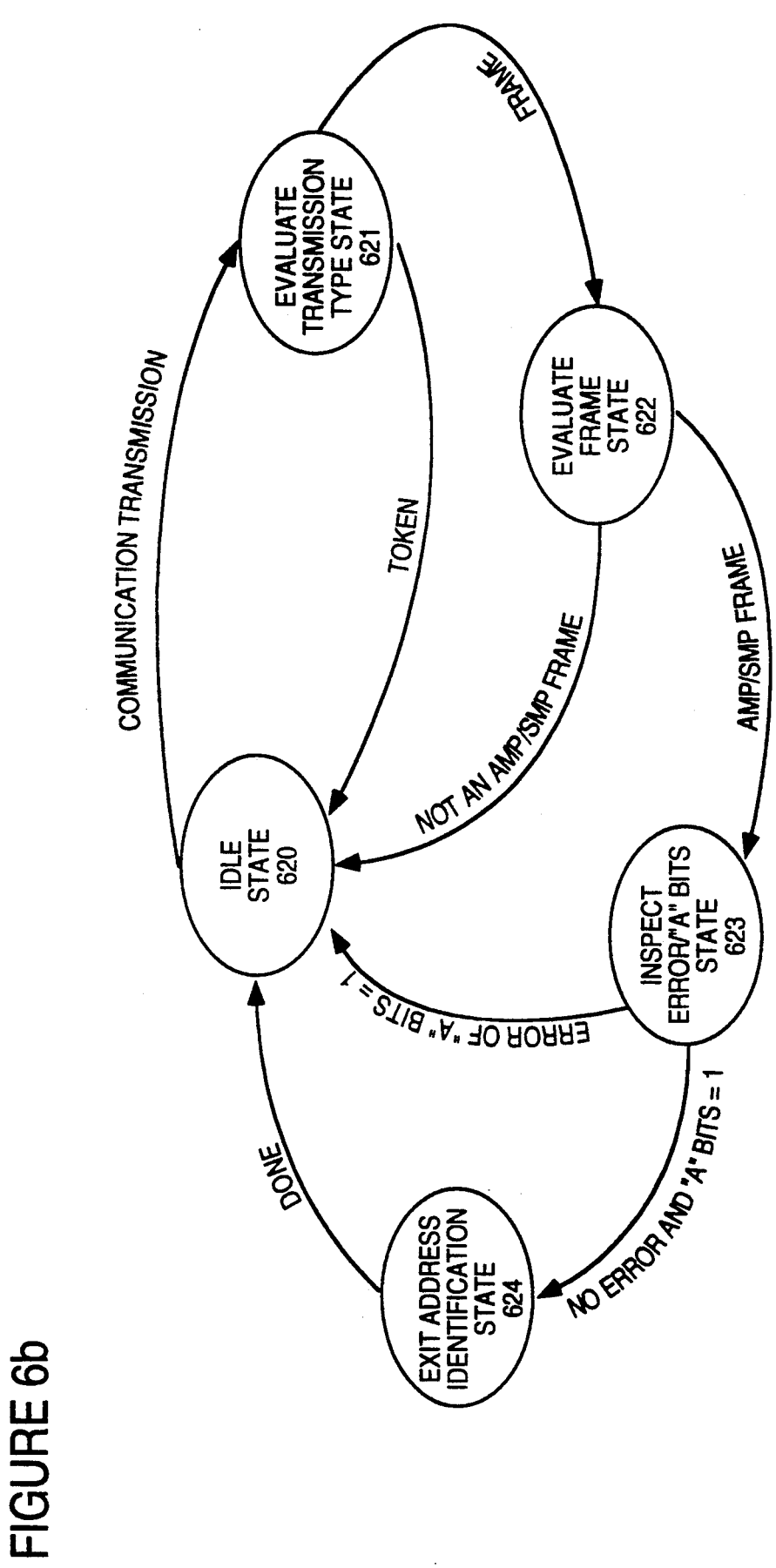
FIG. 6b is a state diagram for a means for detecting an exit station address, as may be utilized in the preferred embodiment of the present invention.

The Exit Station Detection Means (ESDM) of the preferred embodiment is described further with reference to the state diagram illustration FIG. 6b. While waiting for a data communication transmission such an ESDM is in the idle state 620. When a communication transmission is received by the port, the enters an evaluate transmission state 621. If a token is received, the ESDM will return to the idle state 620. Conversely, if a frame is received, the ESDM will then return to the evaluate frame state 622. During the evaluation of a frame, if it determined that it is not a multicast AMP/SMP frame that has been transmitted and received by the port, the circuit will again enter idle state 620. If it is determined that a multicast AMP/SMP frame is received, the ESDM will enter a state where it will inspect the address recognized or ("A") bits state 623. As described above in this state the ESDM will detect if the DTE transmitting the multicast AMP/SMP frame is the immediately preceding DTE. If the ("A") bits are set (have a logical one (1) value), i.e. the preceding DTE was not the transmitting DTE, the idle state 620 is again entered. Finally, if the ("A") bits are not set and no errors exist, an exit address identification state 624 is entered. In the exit address identification state 624, the address of the transmitting DTE is forwarded to a network management module for entering into the exit address table for that port.

It should also be noted that the method of the preferred embodiment allows exit station addresses to be dynamically determined. Moreover, since broadcast frames are normally sent during the operation of a network using the IEEE 802.5 protocol, no additional data transmissions are required. Finally, once an exit station address is determined, the method need not be further performed for all data transmissions. However, it may be desirable to perform the function periodically in order to facilitate dynamic addition or removal of DTEs from the network, without requiring the halting of the network.

Circuit Implementation

As described above, the preferred embodiment is implemented on each port. Thus, it is understood that a circuit embodiment of the present invention would reside on each port of the network concentrator.

Figure 7A:
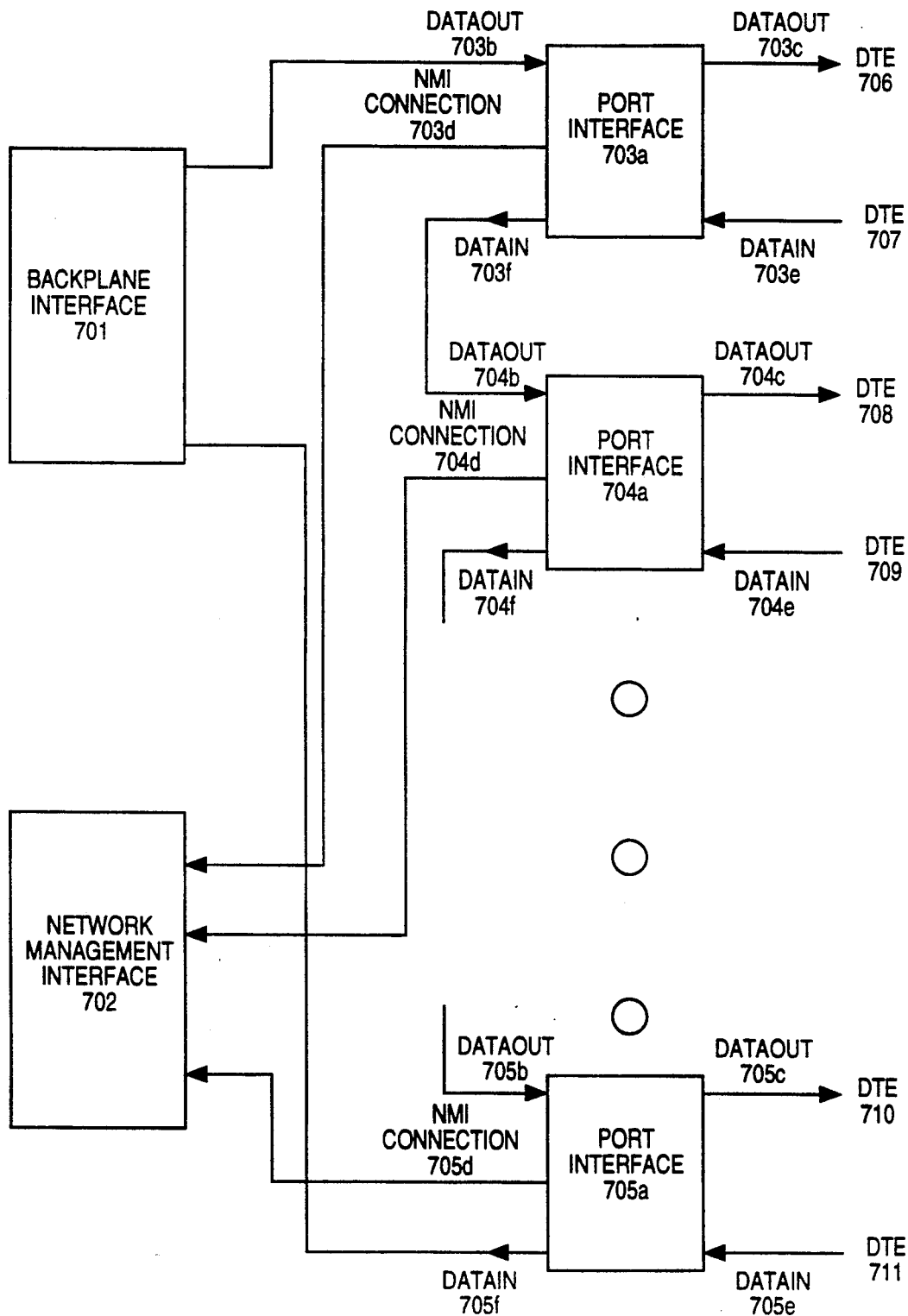
FIG. 7a is a functional block diagram of a prior art host module including ports, as may be utilized in a network concentrator.

FIG. 7a is a functional block diagram of a prior art post module, including ports. Referring to FIG. 7a, included in a host module are a back plane interface 701 and network management interface 702. The back plane interface 701 provides the protocol and electrical interface to the back plane of the network concentrator back plane bus. Similarly, the network management interface 702 provides the protocol and electrical interfaces to the network management interface bus of the back plane of the concentrator. Also illustrated are representative port interfaces, here Port Interface 703a, 704a and 705a. Different implementations of a host module may have different numbers of port interfaces. For example, in the LattisNet System 3000 TM, available from the SynOptics Corporation of Santa Clara, Calif., eight port interfaces are provided on a host module.

Referring back to FIG. 7a, the back plane interface provides a Data Out signal 703b to the first Port Interface 703a. This Data Out signal 703b is translated into the Data Out 703c which is coupled to a DTE 706d. Similarly, a Data In 703e originates from a DTE 707 and is transmitted to Data In 703f which in turn is coupled directly to the Data Out 704b of Port Interface 704a. It should be noted that it known prior art systems it was required that the DTE coupled to Data Out 703c be the same as the DTE coupled to the Data In 703e. In the network concentrator of the currently preferred embodiment, this is not true. For example, DTE 706 and DTE 707 may be different. Finally, the Port Interface 703a is coupled to network manage interface 702 via NMI connection 703d. Information communicated on NMI Connection 703d would include a Port Interface address, and/or network management commands, e.g., a port partition that would originate from network management module.

As described above, the Data In 703f of Port Interface 703a is directly coupled to Data Out 704 of Port Interface of 704a. This is indicative of a ring topology. Port interface 704a also has Data Out 704c coupled to a DTE 708, 704e Data In coupled to a DTE 709, NMI Connection 704d coupling the Port Interface 704a to the network management interface 702, and finally the Data In 704f which would be coupled to the next port on the host module. Finally, with respect to Port Interface 705a a Data Out 705b is coupled to a Data Out 705c which in turn is coupled to the DTE 710, and the DTE 711 is coupled to the Port Interface 705a through Data In 705e which in turn is coupled to the back plane interface 701 via the Data In 705f. Note that Data In 705f would couple to the Data Out of the first port on the next successive host module. And finally, Port Interface 705a is coupled to network management interface 702 via NMI Connection 705d.

Figure 7B:
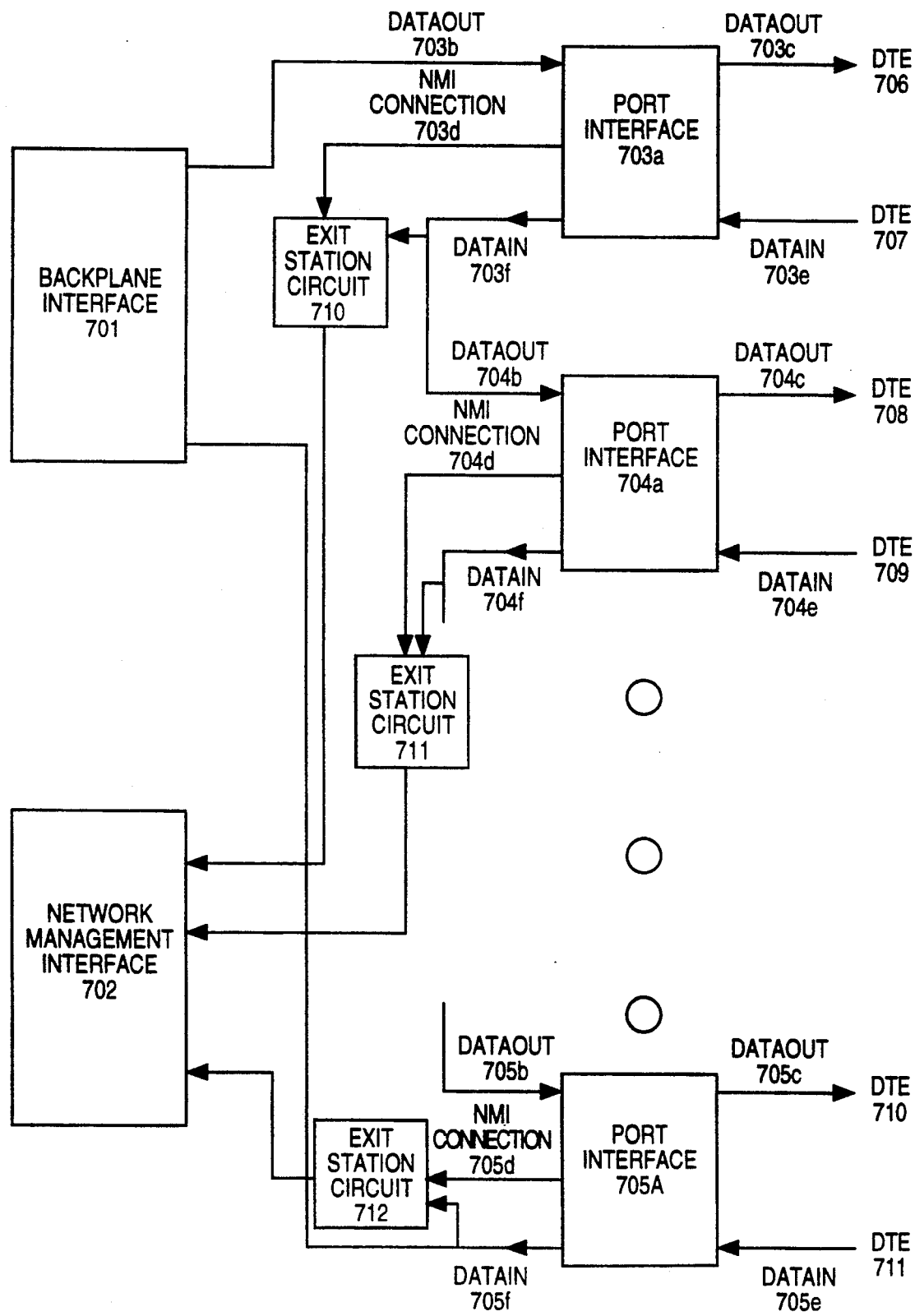
FIG. 7b is a functional block diagram of a host module, including ports and an exit station address circuit, as may be utilized in the preferred embodiment of the present invention.

FIG. 7b illustrates a host module, such as the one illustrated in FIG. 7a, but which includes an exit station circuit. Referring to FIG. 7b, an exit station circuit 710 is coupled to the Data In 703f of Port Interface 703a. The exit station circuit 710 is further coupled to network management interface 702 via the network management interface line 703d. This configuration is repeated for each of the respective port Interfaces 704a-705a, via exits station circuit 711 and 712, respectively. The exit stations circuit of the preferred embodiment is described in more detail below.

Figure 8:
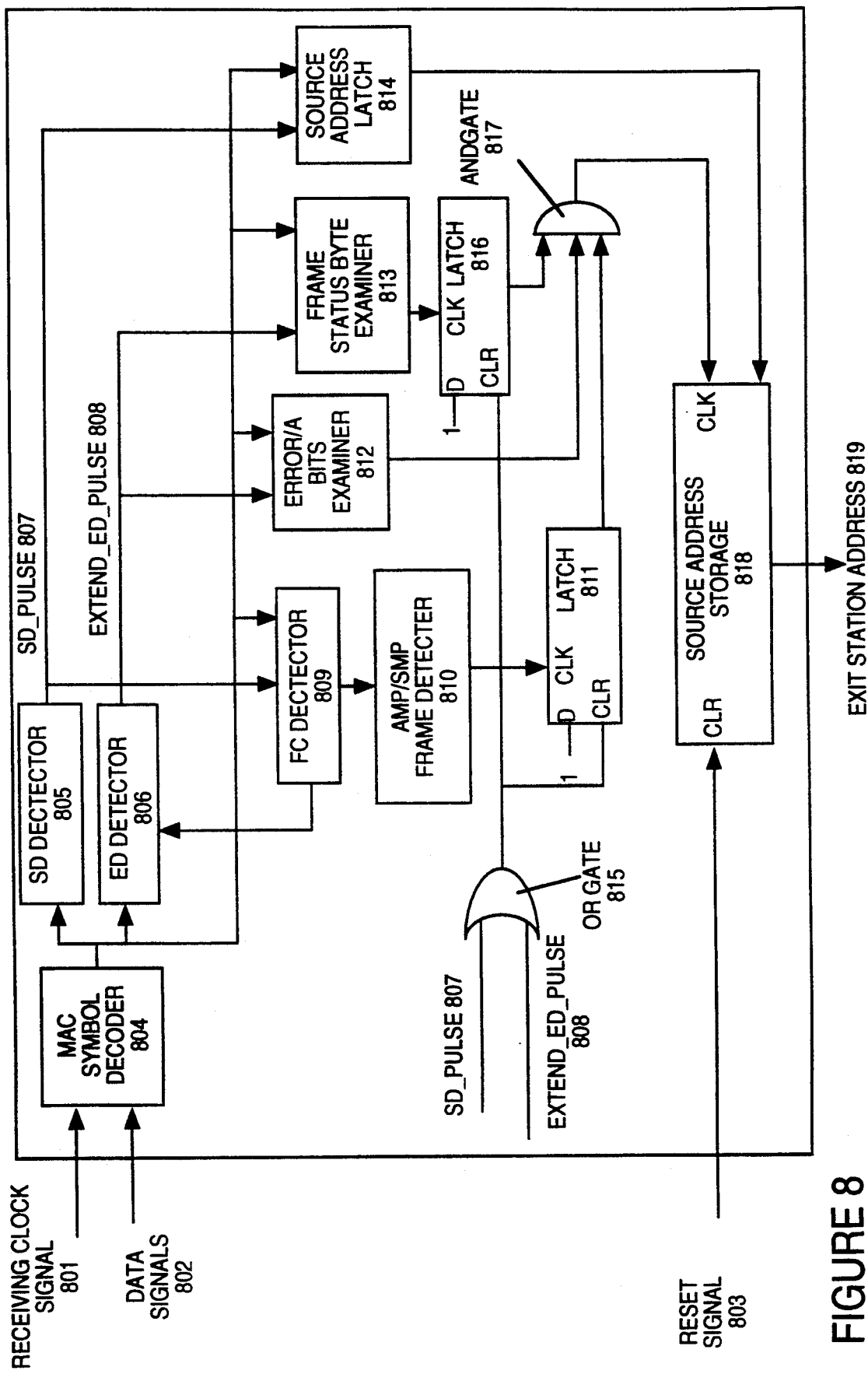
FIG. 8 is a functional block diagram of a circuit which will identify an exit station address on a port, as may be utilized by the preferred embodiment of the present invention.

FIG. 8 is a functional block diagram of a circuit for identifying an exit station address (e.g. the exit address circuits 710-712 of FIG. 7b). First, a receiving clock signal 801 and data signals 802 are provided to a Media Access Control (MAC) symbol decoder 804. The data signals 802 will represent the frame or token that is being transmitted from the DTE and through the port. The MAC symbol decoder 804 is used to extract certain key fields, that were described above, that will be used to identify the exit station address. Coupled to the MAC symbol decoder is a start delimiter detector 805. The start delimiter detector detects the predetermined start delimiter bit stream. Once the start delimiter is detected, the start delimiter detector 805 initiates a start delimiter pulse 807. The start delimiter pulse is provided to source address latch 814 and FC detector 809. The source address latch 814 is used to store the source address provided in the frame. The FC detector 809 is used to determine whether a MAC control frame a Link Layer Control (LLC) frame or a token is being transmitted. If a token or LLC frame is being transmitted, a signal is sent to end delimiter detector 806, which is used to identify the end of a frame. If the detected transmission is a frame, a signal is sent to the broadcast frame detector 810 to determine whether or not the frame is a an AMP/SMP frame. The AMP/SMP frame detector 810 is used as a clock input to latch 811. The latch 811 output is provided as one of three inputs to "and" gate 817. The "and" gate 817 takes as input, signals from the A bits examiner 812 and latch 816. The latches 811 and 816 are D flip-flops which are well known in the art. The output of the "and" gate 817 is used as a clock for a source address storage, 818 (also a D flip-flop). The source address storage 818 is used to provide the exit station address 819, which can then be used for building the exit station address map.

The ERROR/A bits examiner 812 is used to examine the address recognized bits in the Frame Status field of the frame. Recall that if the address recognized bits have a zero (0) value, i.e., they are not set, then the DTE from which the frame was received, had originally transmitted the frame. The ERROR/A bits examiner 812 is also used to detect errors in the transmission by examining the end delimiter field. As noted above, the ERROR/A bits examiner 812 provides an output to "and" gate 817. Also coupled to MAC symbol decoder 804 is the end delimiter detector 806. In the 802.5 protocol, the end delimiter refers to a predetermined bit pattern which indicates an end of the frame or token. However, as noted above, following the end delimiter is a Frame Status field. The output of the end delimiter detector 806 is an extended end delimiter pulse 808, which is provided as input to frame status byte examiner 813 and the ERROR/A bits examiner 812.

The SD pulse 807 and extended ED pulse 808 are coupled to "or" gate 815. The output of the "or" gate 815 is coupled to the clear input of latch 811 and the clear input of latch 816. Also note that the D input of each of latches 811 and 816 are set to a high 1 value. The "and" gate 817 provides for only clocking in a source address from source address latch 814, if the frame status byte examiner 813, the AR bits examiner 812 and the broadcast frame detector 810 provide a logical 1 value.

Finally, reset signal 803 is provided to source address storage 818 as a means for clearing its contents. This will provide a simple means for resetting the circuit.

Referring now briefly to FIG. 9, a breakdown of the major signals propagating through the circuit is described. First, the receiving data 802 is represented by the signals 901. The start delimiter pulse 807 is high during the occurrence of the start delimiter. This is indicated in the SD pulse having a high value 902. Similarly, the extend ED pulse 808 maintains a high value at the beginning of the detection of the end delimiter through the end of the frame, including the Frame Status field, as indicated by 903. The output of the frame status byte examiner 813 maintains a high value at a time similar to extend SD pulse 808. Finally, the output of the A bits examiner 812 maintains a high value 905 at the time that the frame status byte is being examined.

Thus, a method and apparatus for associating one or more station, with a particular port on a network concentrator, is disclosed.

I claim:

1. In a network having stations coupled through a network concentrator, said network concentrator having a plurality of host modules, each host module defining a plurality of ports, said ports for coupling one or more stations to said network concentrator, a method for identifying stations coupled to a port, said method comprising the steps of:

a) generating a station map of all the stations coupled to said network concentrator;
   b) generating a port map of ports to which stations are coupled;
   c) generating an exit station map which identifies an exit station for each of said ports in said port map, said exit station being a station which transmits data into a corresponding port;
   d) for a first port to which stations are coupled, identifying an immediately upstream port to which stations are coupled from said port map;
   e) identifying an exit station for said first port and an exit station for said immediately upstream port from said exit station map; and
   f) identifying stations between said exit station for said immediately upstream port and said exit station for said first port from said station map, wherein said identified stations are coupled to said first port.

2. The method as recited in claim 1 wherein said step of generating an exit station map is performed while said network is in operation and communication transmissions are being transmitted and received by stations in said network, said communication transmissions comprising frames and tokens, said step of generating an exit station map further comprising the steps of:

for each port in said port map:
   a) receiving a communication transmission as it enters a port from an exit station for said port;
   b) identifying said communication transmission as a frame or a token;
   c) if said communication transmission is a token, transmitting said communication transmission to a next station;
   d) if said communication transmission is a frame, identifying a frame type for said frame;
   e) if said frame type is a predetermined frame type, extracting location information indicative of the location of a source station of said communication transmission;
   f) if said location information is a first predetermined value, extracting a source address of said source station from said communication transmission and transmitting said communication transmission to said next station, and wherein said source address is the exit station for said port; and
   h) if said location information is not said first predetermined value or said frame type is not said predetermined frame type, transmitting said communication transmission to said next station.

3. The method as recited in claim 2 wherein said step of identifying stations between said exit station for said immediately upstream port and said exit station for said first port from said station map is further comprised of the step of checking for a SNIFFER device at said first port and said immediately upstream port, said step of checking for a SNIFFER device comprising the step of:

(a) comparing the exit station for a first upstream port with the exit station for said first port;
   (b) if said exit station for said first upstream port is the same as the exit station for said first port, identifying said first port as coupled to a SNIFFER device;
   (c) if said exit station for said first upstream port is not the same as the exit station for said first port, comparing the exit station for said first upstream port with the exit station for a second upstream port;
   (d) if the exit station for said first upstream port is the same as the exit station for said second upstream port, identifying said first upstream port as a SNIFFER device.

4. The method as recited in claim 3 wherein said network is an IEEE 802.5 token-ring network.

5. The method as recited in claim 4 wherein said predetermined frame type is an Active Monitor Present (AMP) Media Access Control (MAC) Control frame or Stand-By Monitor Present (SMP) MAC Control frame.

6. A network concentrator for interconnecting stations together in a network having a ring topology, said network concentrator comprising:

communication transmission means for transmitting communication transmissions between stations connected to said network concentrator and further for transmitting network information generated by a host module, to a processing means;
   at least one host module coupled to said communication transmission means, said at least one host module for coupling stations to said network concentrator, said at least one host module having one or more ports;
   said one or more ports of a host module for electrically connecting at least one station to said host module, each of said one or more ports having a means for identifying an exit station for a corresponding port; and
   said processing means for performing network management functions for said network including generating a station map, a port map and an exit station map from said network information, said station map for identifying all the stations coupled to said network concentrator; said port map for identifying all ports on said concentrator which have a station connected thereto and said exit station map for identifying all exit stations coupled to said network concentrator, said processing means further for determining the stations coupled to each of said one or more ports.

7. The network concentrator as recited in claim 6 wherein said means for identifying an exit station for a corresponding port is further comprised of:

a) means for identifying a communication transmission as a polling frame;
   b) means for extracting a source address from said communication transmission, said source address corresponding to the station from which said communication transmission originated;
   c) storage means for storing said source address; and
   d) means for extracting location information from said polling frame, said location information for determining if said source address is an exit station for said port.

8. In a network concentrator having one or more ports for coupling stations, a circuit coupled to each of said one or more ports for identifying an exit station for a corresponding port, said circuit comprised of:

means for identifying a communication transmission as a polling frame, said polling frame containing a source address of a station originating said polling frame and location information indicating the location of said station originating said polling frame;

means for extracting said source address from said communication transmission;

storage means for storing said source address;

means for extracting said location information from said polling frame; and means for examining said location information to determine if said station originating said polling frame is an exit station for said port.

9. A network comprising:

a network concentrator for interconnecting stations in a ring topology using a network protocol, said network concentrator comprising a plurality of ports for attaching one or more stations and a processing means;

a plurality of stations each coupled to one of said plurality of ports of said network concentrator;

means for identifying stations coupled to a port of said network concentrator; and each of said plurality of ports is further comprised of means for identifying an exit station for a corresponding port comprising:

means for detecting a communication transmission;

means for identifying said communication transmission as a polling frame;

means for extracting a source address from said polling frame;

storage means for storing said source address;

means for extracting a frame status field from said polling frame and determining the source station of said polling frame, and means for providing said source address to said means for identifying stations coupled to a port of said network concentrator, if said source station of said polling frame is an exit station.

10. The network as recited in claim 9 wherein said network protocol used by said network concentrator is the IEEE 802.5 Standard.

11. The method as recited in claim 1 wherein said predetermined frame type is a polling frame.

12. The network as recited in claim 9 wherein said processing means is further comprised of means for performing network management functions for said network including generating a station map, a port map and an exit station map, said station map for identifying all the stations coupled to said network concentrator, said port map for identifying all ports on said network concentrator which have a station connected thereto, and said exit station map for identifying all exit stations coupled to said network concentrator.

13. The network as recited in claim 12 wherein said means for identifying stations coupled to a port of said network concentrator is further comprised of:

means for identifying an upstream port from said port based on said port map;

means for identifying an exit station for said upstream port and an exit station for said port;

means for identifying stations between said exit for said upstream port and said exit station for said port, said identified stations being coupled to said port.

* * * * *